US012252913B2

(12) United States Patent
Zeppetelli

(10) Patent No.: US 12,252,913 B2
(45) Date of Patent: Mar. 18, 2025

(54) DOOR SECUREMENT DEVICE AND METHOD

(71) Applicant: G-Force Deterrent LLC, Pompton Plains, NJ (US)

(72) Inventor: Joseph A. Zeppetelli, Pompton Plains, NJ (US)

(73) Assignee: G-FORCE DETERRENT LLC, Pompton Plains, NJ (US)

( * ) Notice: Subject to any disclaimer, the term of this patent is extended or adjusted under 35 U.S.C. 154(b) by 130 days.

(21) Appl. No.: 18/063,985

(22) Filed: Dec. 9, 2022

(65) Prior Publication Data

US 2023/0184014 A1 Jun. 15, 2023

Related U.S. Application Data

(60) Provisional application No. 63/288,194, filed on Dec. 10, 2021.

(51) Int. Cl.
*E05C 19/18* (2006.01)
*E05C 17/54* (2006.01)

(52) U.S. Cl.
CPC ............ *E05C 19/184* (2013.01); *E05C 17/54* (2013.01); *E05C 19/188* (2013.01)

(58) Field of Classification Search
CPC ...... E05C 19/184; E05C 19/18; E05C 19/003; E05C 7/00; E05C 17/54; E05C 19/004; E05C 19/188; E05C 17/047
See application file for complete search history.

(56) References Cited

U.S. PATENT DOCUMENTS

| | | | | |
|---|---|---|---|---|
| 359,815 A * | 3/1887 | Sargent | E05C 19/182 | 269/208 |
| 652,792 A * | 7/1900 | Lloyd | E05C 19/18 | 292/206 |

(Continued)

FOREIGN PATENT DOCUMENTS

| | | | |
|---|---|---|---|
| GB | 2177156 A * | 1/1987 | E05C 17/54 |
| SE | 9601705 A * | 11/1997 | E05C 19/18 |
| WO | WO-9524535 A1 * | 9/1995 | E05C 19/003 |

*Primary Examiner* — Christine M Mills
*Assistant Examiner* — Faria F Ahmad
(74) *Attorney, Agent, or Firm* — ROSSI, KIMMS & McDOWELL LLP

(57) ABSTRACT

Aspects of the present invention are directed to a door securement device for securing a door to a door frame having a front door frame wall, the door having a first fastener attached thereto and the frame having a second fastener attached thereto. The door securement device can include a top wall, a first side wall extending substantially perpendicularly outwardly from the top wall, a second side wall extending substantially perpendicularly outwardly from the top wall, and substantially perpendicularly from the first side wall. The door securement device can also include a first slot defined in the first side wall and a second slot defined in the second side wall. The first and second slot portions can be sized and shaped to retain respective heads of the first and second fasteners. The first side wall can be sized and shaped to be positioned adjacent to one of a surface of the door and the front door frame wall, and the second side wall can be sized and shaped to be positioned adjacent to the other of the a surface of the door and surface of the front door frame wall.

6 Claims, 8 Drawing Sheets

(56) References Cited

U.S. PATENT DOCUMENTS 994,001 A * 5/1911 Hunt .......... E05C 19/18 292/258
1,040,505 A * 10/1912 Buskirk .......... E05C 17/54 254/39
1,043,842 A * 11/1912 Kahn .......... E05C 19/18 292/288
1,079,029 A * 11/1913 Sheppard .......... E05F 11/00 292/206
2,151,587 A * 3/1939 Cassileth .......... E05C 19/18 292/288
3,309,126 A * 3/1967 Schuette .......... E05C 19/18 292/87
3,494,653 A * 2/1970 Steele .......... E05C 19/182 292/291
3,583,738 A * 6/1971 Uphoff .......... E05C 19/10 292/114
4,082,334 A * 4/1978 Volta .......... E05C 19/003 292/288
4,334,705 A * 6/1982 Rumph .......... E05C 19/18 292/288
4,346,926 A * 8/1982 Lucas .......... E05C 19/004 292/338
4,379,576 A * 4/1983 Blough .......... E05B 67/383 292/205
4,630,854 A * 12/1986 Persson .......... E05C 17/54 292/343
4,955,648 A * 9/1990 Miller .......... E05C 19/18 292/288
4,958,868 A * 9/1990 Watrous, Jr. .......... E05C 19/184 292/258
5,291,760 A * 3/1994 Schrader .......... E05C 19/18 292/288
5,501,493 A * 3/1996 Arthur .......... E05C 19/18 292/288
5,509,235 A * 4/1996 Chander .......... E05C 17/025 160/40
5,556,143 A * 9/1996 Robinson .......... E05C 19/184 292/259 R
5,666,831 A * 9/1997 Doros .......... E05B 35/008 81/436
D442,465 S * 5/2001 Johns .......... D8/336
6,609,739 B1 * 8/2003 Avganim .......... E05C 19/184 70/2
8,469,410 B2 * 6/2013 Wood .......... E05C 7/00 292/288
9,255,424 B1 * 2/2016 Dorlac .......... E05B 15/0205
D758,968 S * 6/2016 El Zakhem .......... D13/122
9,546,506 B1 * 1/2017 Kangatharalingam .......... E05C 19/184
10,689,890 B2 * 6/2020 Taylor .......... E05C 19/184
11,414,906 B1 * 8/2022 Tallent .......... E05D 11/1007
11,788,328 B1 * 10/2023 Helms .......... E05C 17/54 16/82
D1,012,664 S * 1/2024 Zeppetelli .......... D8/330
12,018,519 B2 * 6/2024 Salcido .......... E05C 19/184
2002/0067046 A1 * 6/2002 Cox, Sr. .......... E05C 19/184 292/289
2008/0079270 A1 * 4/2008 Carlson .......... E05C 17/025 292/343
2009/0160200 A1 * 6/2009 Greenway .......... E05C 7/04 292/268
2014/0103668 A1 * 4/2014 McKinney .......... E05C 19/188 292/258
2014/0117681 A1 * 5/2014 Jenkins .......... E05C 19/188 292/256.71
2015/0130196 A1 * 5/2015 Letson .......... E05C 21/00 292/292
2018/0371810 A1 * 12/2018 Howard .......... E05C 1/04
2019/0003221 A1 * 1/2019 Taylor .......... E05C 19/004
2019/0226252 A1 * 7/2019 Patton .......... E05C 19/184
2020/0011099 A1 * 1/2020 Harrelson .......... E05B 17/2092
2021/0340795 A1 * 11/2021 Brown .......... E05B 65/0032
2021/0340796 A1 * 11/2021 Canaday .......... E05C 19/006
2022/0074246 A1 * 3/2022 Wittlin .......... E05D 15/24
2022/0136295 A1 * 5/2022 Gizas .......... E05C 19/003 292/259 R
2023/0147265 A1 * 5/2023 Reger .......... E05C 19/003 70/91
2023/0340817 A1 * 10/2023 Salcido .......... E05C 19/184

* cited by examiner

DOOR SECUREMENT DEVICE AND METHOD

BACKGROUND

Field

This disclosure is generally related to door securing devices, and, in particular, door securing devices suitable for use in schools to secure doors during emergency situations.

Description of the Related Art

School safety has become a high priority in the current environment. Unfortunately, as has been widely reported, many incidents have occurred in which individuals have entered schools with firearms with the intent of shooting students, teachers, and other occupants of the school. During such unfortunate situations, teachers and students would benefit if the doors to classrooms could be quickly and efficiently secured or locked against opening from a potential shooter.

Various impediments exist, however, for allowing the quick and effective securing of a classroom door. First, doors in schools traditionally have not been originally designed to be secured or locked from within the classroom. One cause for this is concern for students during a situation which requires students to be able to quickly exit a classroom, such as during a school fire or an impending weather emergency. For this reason, laws and regulations have been put in place to guarantee that classroom doors are not obstructed from opening in an emergency situation, such as a fire, when students and teachers will likely be panicking. As a result, traditional door securing or locking devices often do not meet the requirements of school safety laws and regulations.

Thus, in situations involving a potential school shooter or other such danger, schools are in need of a device that allows a door to be secured quickly and effectively. Currently, while certain devices have been devised to address this need, these devices each have certain shortcomings. For example, some of the devices require hardware to be secured to a floor near the door, which could present an obstacle to people moving through the doorway, and which could violate certain safety laws or regulations. In addition, some of the proposed devices include multiple components that have to be arranged in a relatively complex specific configuration to secure a door. Such devices are difficult for a teacher or student to install quickly, however, during a situation in which panic may set in. Further, certain proposed door securing systems are relatively expensive to purchase and install. As such door securing devices are meant to be installed on each classroom door in a school, the total cost of such systems can be expensive for schools, which typically have strict budget constraints.

Thus, there is a need for schools to have door securement devices that can effectively secure a door against an attacker, and can be easily and quickly used to secure a door by a teacher or student during a time of emotional stress. Further, there is a need for such a door securing device to be easy to install, and to be cost effective.

BRIEF SUMMARY

Embodiments of the invention address the above-discussed and other problems in the art.

Aspects of the present invention are directed to a door securement device for securing a door to a door frame, the door having a fastener attached thereto. The securement device van include a back wall; a first side wall extending outwardly from the back wall; a second side wall extending outwardly from the back wall; a first securing portion extending outwardly from the first side wall; a second securing portion extending outwardly from the second side wall; and an aperture defined in the back wall, the aperture including a center portion and first and second slot portions; wherein the slot portions are sized and shaped to retain a head of the fastener; and wherein the first side wall is sized and shaped to be positioned adjacent a side edge of the door frame, and the first securing portion is sized and shaped to be positioned adjacent a front edge of the door frame.

In some embodiments, the first and second side walls extend outwardly in a direction substantially perpendicular to the back wall.

In some embodiments, the first securement portion extends outwardly from the first side wall in a direction substantially perpendicular to the first side wall, and the second securement portion extends outwardly from the second side wall in a direction substantially perpendicular to the second side wall.

In some embodiments, the back wall, first and second side walls and first and second securement portions are formed from steel.

In some embodiments, the second side wall is sized and shaped to be positioned adjacent a side edge of another door frame, and the second securing portion is sized and shaped to be positioned adjacent a front edge of another door frame.

In some embodiments, the back wall includes a back wall surface, the first side wall includes a first side wall surface, the first securing portion includes a first securing portion surface, and the first side wall surface is sized and shaped to be positioned adjacent a side edge of the door frame, the first securing portion surface is sized and shaped to be positioned adjacent a front edge of the door frame, and the back wall surface is sized and shaped to be positioned adjacent a surface of the door.

In some embodiments, the back wall has a width in the range of 1.9 to 2.1 inches, the first and second side walls each have a width in the range of 2.0-2.5 inches, and a first and second securing portions each have a width in the range of 0.4-0.6 inches.

In some embodiments, the frame is a stepped frame.

In some embodiments, the center portion of the aperture is dimensioned to have a width larger than that of the head of the fastener to allow the head of the fastener to pass through the center portion.

Other aspects of the present invention are directed to a method of making a door securement device for securing a door to a door frame, the door having a fastener attached thereto, the door securement device including a back wall, a first side wall extending outwardly from the back wall, a second side wall extending outwardly from the back wall, a first securing portion extending outwardly from the first side wall, a second securing portion extending outwardly from the second side wall, an aperture defined in the back wall, the aperture including a center portion and first and second slot portions, wherein the slot portions are sized and shaped to retain a head of the fastener, and wherein the first side wall is sized and shaped to be positioned adjacent a side edge of the door frame, and the first securing portion is sized and shaped to be positioned adjacent a front edge of the door frame. The method can include stamping a predetermined shaped portion of steel, bending the portion of steel to form the back wall, the first side wall the second side wall, the first securing portion and the second securing portion.

Still other aspects of the present invention are directed to a door securement device for securing a door to a door frame having a front door frame wall, the door having a first fastener attached thereto and the frame having a second fastener attached thereto. The door securement device can include a top wall, a first side wall extending substantially perpendicularly outwardly from the top wall, a second side wall extending substantially perpendicularly outwardly from the top wall, and substantially perpendicularly from the first side wall, a first slot defined in the first side wall and a second slot defined in the second side wall. The first and second slot portions can be sized and shaped to retain respective heads of the first and second fasteners, and the first side wall can be sized and shaped to be positioned adjacent to one of a surface of the door and the front door frame wall, and the second side wall is sized and shaped to be positioned adjacent to the other of the a surface of the door and surface of the front door frame wall.

In some embodiments, the top wall, first side wall and second side wall are formed from steel.

In some embodiments, the first side wall includes a first side wall surface, the second side wall includes a second side wall surface, and the first side wall surface is sized and shaped to be positioned adjacent to one of a surface of the door and the front door frame wall, and the second side wall surface is sized and shaped to be positioned adjacent to the other of the a surface of the door and surface of the front door frame wall.

In some embodiments, the door frame is a non-stepped door frame.

In some embodiments, the first slot and the second slot are tapered such that heads of the first fastener and second fastener, respectively, can be retained by narrow portions of the slots, and not retained by wider portions of the slots.

In some embodiments, the top wall has a width in the range of 1.5 to 2.0 inches, the first side wall has a height in the range of 2.25-2.75 inches; and the first side wall has a height in the range of 2.25-2.75 inches.

Still other aspects of the present invention are directed to a method of making a door securement device for securing a door to a door frame having a front door frame wall, the door having a first fastener attached thereto and the frame having a second fastener attached thereto, the securement device including a top wall, a first side wall extending substantially perpendicularly outwardly from the top wall, a second side wall extending substantially perpendicularly outwardly from the top wall, and substantially perpendicularly from the first side wall, a first slot defined in the first side wall; and a second slot defined in the second side wall, wherein the first and second slot portions are sized and shaped to retain respective heads of the first and second fasteners, and wherein the first side wall is sized and shaped to be positioned adjacent to one of a surface of the door and the front door frame wall, and the second side wall is sized and shaped to be positioned adjacent to the other of the a surface of the door and surface of the front door frame wall. The method can include stamping a predetermined shaped portion of steel, bending the portion of steel to form the top wall, the first side wall; and the second side wall.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various embodiments of the invention. However, one skilled in the art will understand that the invention may be practiced without these details. In other instances, well-known structures have not been shown or described in detail to avoid unnecessarily obscuring descriptions of the embodiments of the invention.

Reference throughout this specification to "one embodiment" or "an embodiment" or "an example embodiment" or "an illustrated embodiment" means that a particular feature, structure or characteristic described in connection with the embodiment is included in at least one embodiment of the present invention. Thus, the appearances of the phrases such as "in one embodiment" or "in an embodiment" in various places throughout this specification are not necessarily all referring to the same embodiment. Furthermore, the particular features, structures, or characteristics may be combined in any suitable manner in one or more embodiments. Thus, portions of different embodiments and/or drawings can be combined, as would be understood by one of skill in the art.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings provided herein are for convenience only and do not interpret the scope or meaning of the claimed invention.

Figure 1:
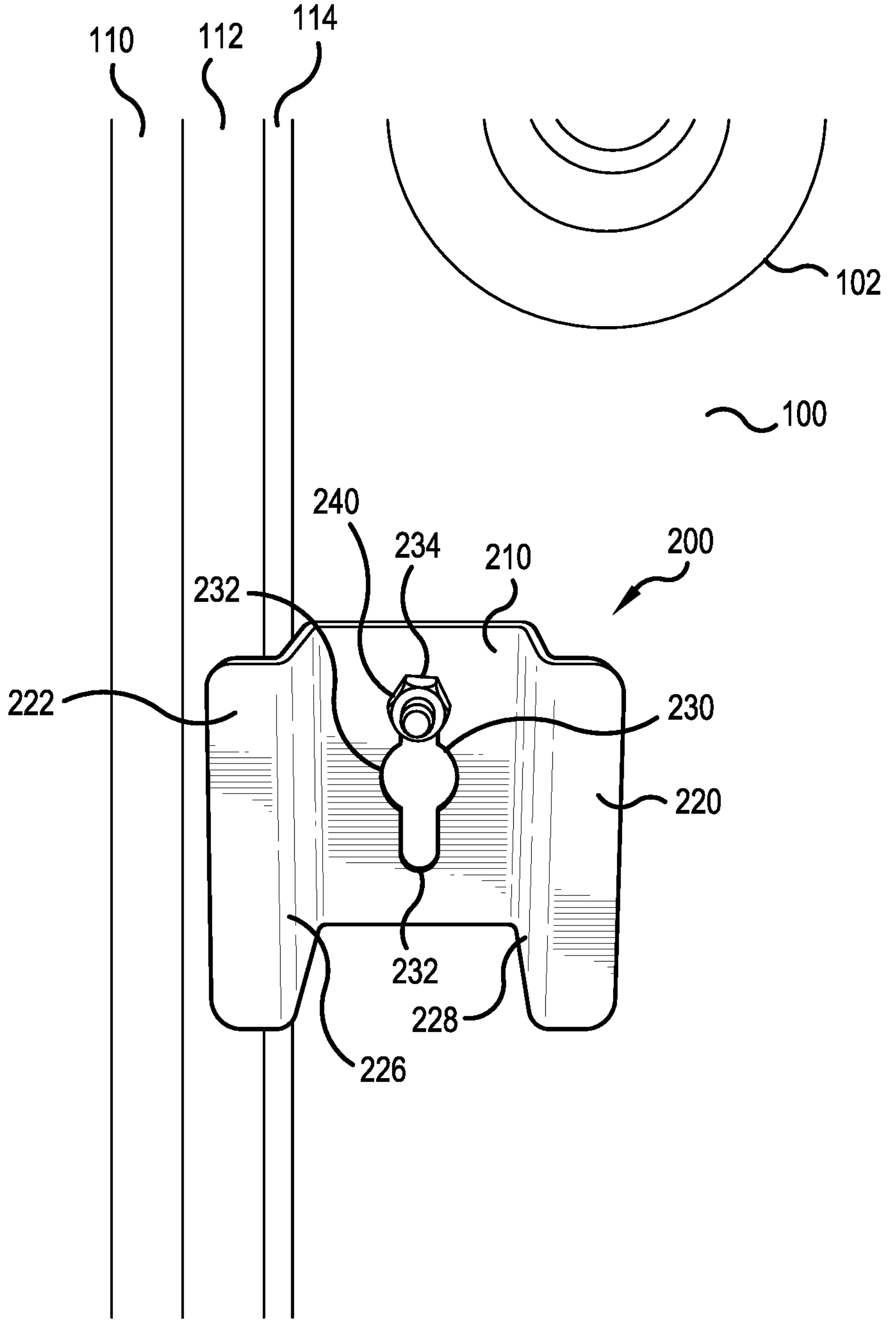
FIG. 1 is a door securement device, positioned on a door and door frame, in accordance with an embodiment of the present invention.

With reference to FIG. 1, a door securement device 200 is positioned to secure a door 100. The securement device 200 is positioned on the door 100 at a position below doorknob 102. In some configurations, the securement device 200 can be positioned on the door 100 above doorknob 102.

The securement device 200 is positioned at a fastener 240 that is attached to door 100. A door frame 110 includes a front edge 112 and side edge 114, arranged substantially perpendicular to front edge 112. Such a door frame can be referred to as a stepped door frame 110. The securement device 200 is positioned such that a securing portion 222 of the securement device 200 abuts or is adjacent to the front edge 112 of the door frame 110. A sidewall 226 of the securement device 200 is positioned to abut or be adjacent to the front edge 112 of door frame 110.

When the securement device 200 is positioned as shown, the door is made to be in a secure closed state. Specifically, if a person attempts to open the door from outside of the classroom, the door 100 will apply force to the securement device 200 via the fastener 240. In turn, the securing portion 222 of the securement device 200 abuts against the front edge 112 of the door frame 110. As a consequence, the securement device 200 positioned as such secures the door and prevents it from being opened from outside the classroom. It should be noted that school classrooms are typically designed such that the doors open out from the classroom. This arrangement is intended to allow for easy exit of the classroom by its occupants. In addition, while the invention is discussed herein with respect to classrooms, the securement device 200 can be used with doors with other types of rooms. As will be discussed in further detail below, the securement device 200 can be easily and quickly put in place to secure the door 11, or removed from position to allow the door 100 to open by a user.

Figure 2:
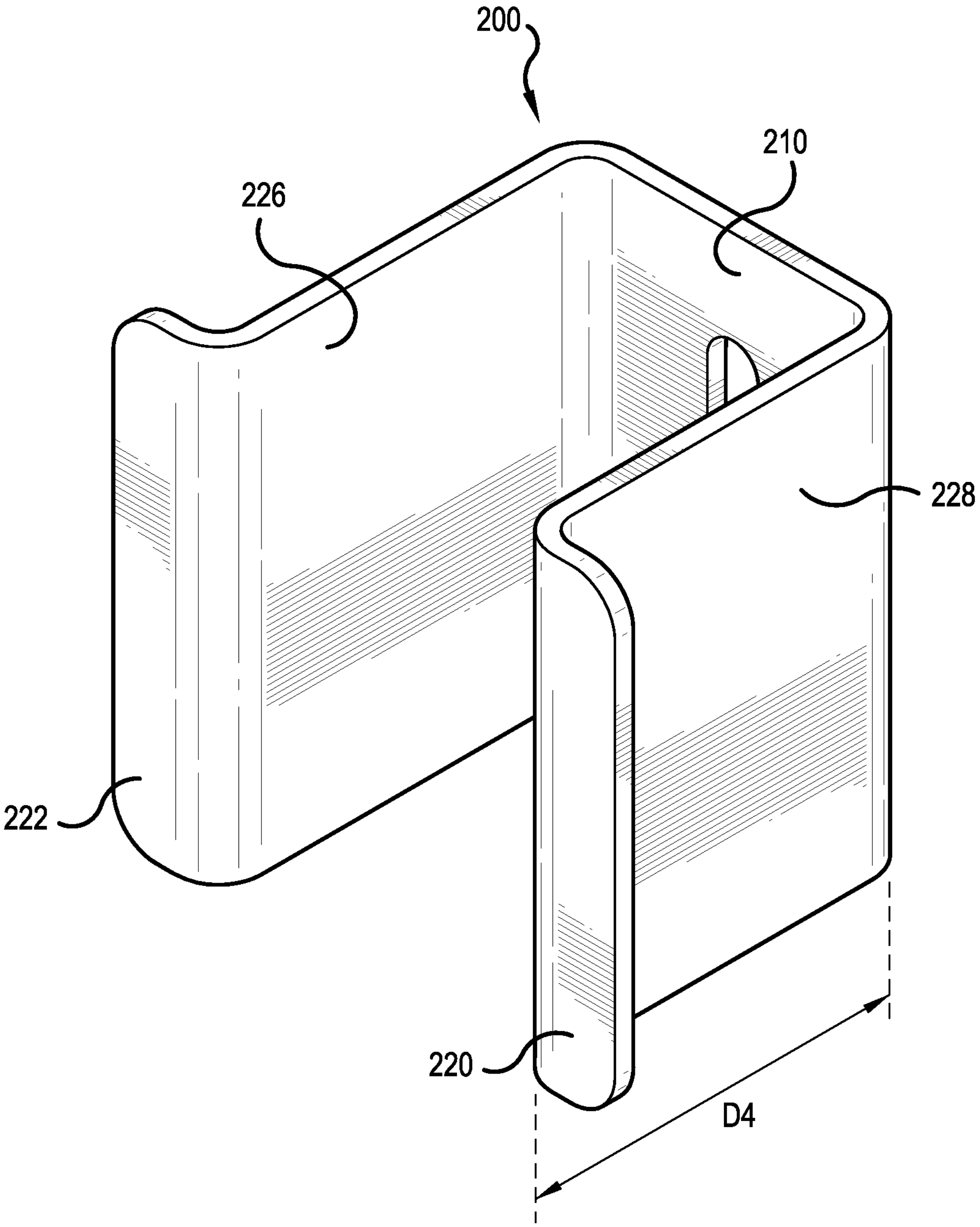
FIG. 2 is a perspective view of the door securement device of FIG. 1.
Figure 3:
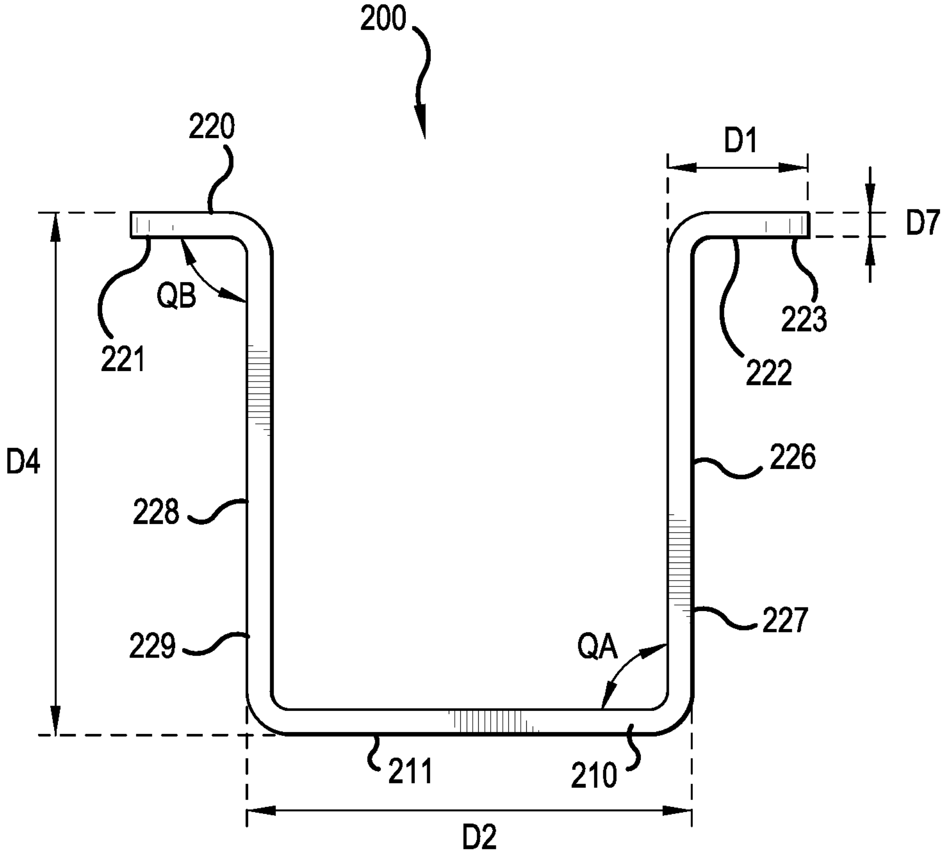
FIG. 3 is top view of the door securement device of FIG. 1.
Figure 4:
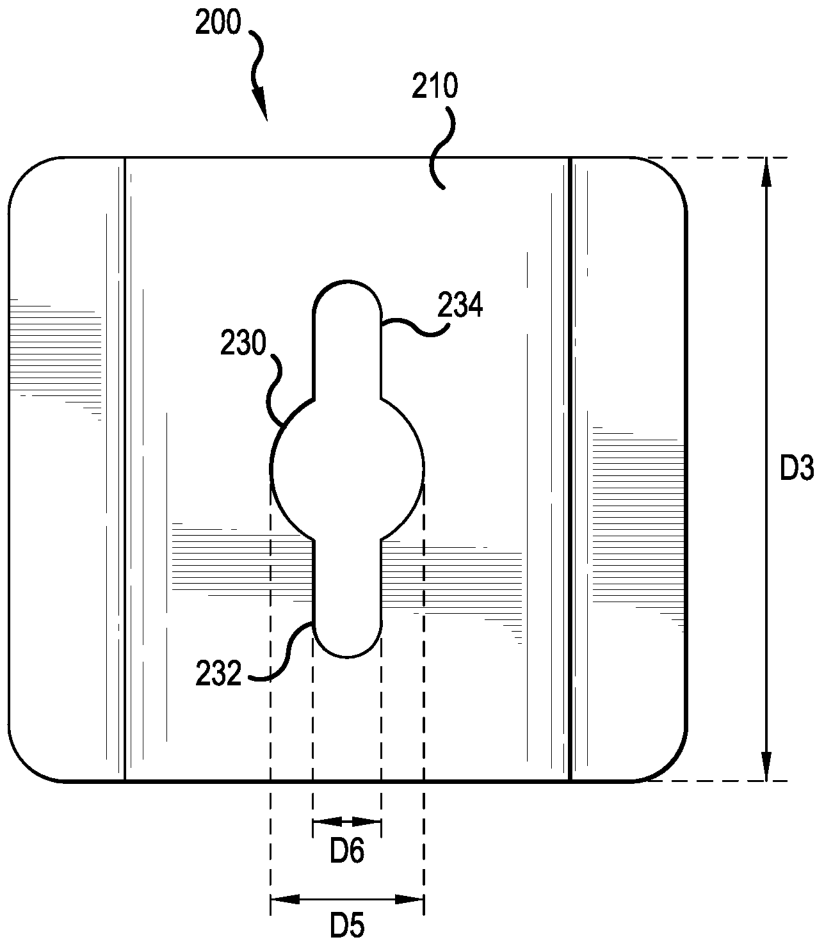
FIG. 4 is a front view of the door securement device of FIG. 1.

With continued reference to FIG. 1, and with reference to FIGS. 2-4, the securement device 200 includes a back wall 210 having a back wall surface 211, which is designed and shaped to be placed substantially flush with a front surface of the door 100. The side walls 226, 228 are attached to and extend away from back wall 210. Side walls 226, 228 include respective side wall surfaces 227, 228. The side walls 226, 228 can be arranged substantially perpendicularly to back wall 210. Each side wall 226, 228 extends outwardly therefrom a respective securing portion 222, 220. The securing portions 222, 220 extend outward substantially perpendicularly from its respective side wall 226 228. Securing portions 222, 220 each include respective securing portion surfaces 221, 223.

An aperture 230 is defined in back wall 210. Aperture 230 includes a center portion 231 and two slot portions 232, 234. The width of center portion 231 is larger than the widths of slot portions 232, 234. In use, the center portion 231 is placed over a head of fastener 240, and then positioned such that one of the slot portions 232, 234 is adjacent a head of the fastener 240. A user can perform this process in reverse to remove the securement device 200 from the fastener 240.

Fastener 240 can be, for example, a screw, a nail, a hook, or other suitable fastener that can be securely attached to the door 100. Preferably, the fastener 240 includes a lip that can overlap a portion of the back wall 210 adjacent a slot portion 232, 234. The fastener 240 remains in place attached to the door 100 irrespective of whether the securement device 200 is put in place or removed from a user. Alternatively, fastener 240 can be implemented as a bolt with a nut and screwed onto the bolt to provide a lip surface for selective attachment to securement device 200. Alternatively, other fasteners can be used, as would be understood by one of skill in the art, as informed by the present disclosure.

As discussed above, securement device 200 is designed to be used with a door frame 110 having a front edge 112, arranged substantially parallel to the door 100 when it is closed, that forms a lip or step about door frame 110, and a side edge 114, that is arranged substantially perpendicular to the door 100 when the door 100 is closed. The securement device 200 is designed and shaped such that one of side walls 226, 228 are positioned adjacent to the side edge 114 and one of respective securing portions 220, 222 are positioned adjacent to the front edge 112. More specifically, the securement device 200 is designed and shaped such that one of side wall surfaces 227, 229 are positioned adjacent to the side edge 114 and one of respective securing portion surfaces 221, 223 are positioned adjacent to the front edge 112.

The determination as to which of the side walls 226, 228 and securing portions 220, 222 are positioned adjacent to front edge 112 of door frame 110 depends upon the relative position of door frame 110 and a side of door 100 that opens (i.e., the side proximate the door knob and opposite the side having hinges) Thus, the securement device 200 is designed and shaped to be used on both right side hinged and left side hinged doors. In addition, because two slot portions 232, 234 are defined back wall 210, as well as because two side walls 226, 228 and respective securing portions 220, 222 are included in securement device 200, securement device can be used with the same door 100 and door frame 110 in either a first orientation or a second inverted orientation which is rotated 180 degrees from the first orientation. This features also facilitates quick and simple use of the securement device by a student or teacher during a stressful situation.

The securement device 200 can be formed of a rigid material such as, for example, steel. The securement device can be formed from a single piece of material, or from connecting multiple pieces of material into a single integral piece. If a single piece of material is used, the single piece could be formed by stamping out a predetermined shape from a piece of material, such as steel, and then bending portions of the stamped out shape to form the various aspects of the securement device 200. Alternatively, securement device 200 could be formed from another substantially rigid material, such as ABS plastic or another suitable plastic, as would be known to those of skill in the art. Alternatively, securement device 200 can be formed by other methods, as would be understood by one of skill in the art.

In some embodiments, the securement device 200 can be made from steel having a thickness D7 in the range of 0.3-0.5 inches, preferably in the range of 0.25-0.45 inches, and more preferably a thickness of about 0.10 inches. The securement device 200 can be formed from 12 gauge steel. Alternatively 11 or 13 gauge steel could be used. The securement device 200 can include the following dimensions. The securing portions 220, 222 can have a width D1 in the range of 0.25-0.75 inches, preferably in the range of 0.4-0.6 inches, and more preferably a width of about 0.5 inches. The back wall 210 can have a width D2 in the range of 1.7-2.3 inches, preferably in the range of 1.9-2.1 inches, and more preferably a width of about 2.0 inches. Alternatively, in some embodiments, other dimensions can be used, as would be understood by one of skill in the art, as informed by the present disclosure.

The securing portions 220, 222 can have a height D3 in the range of 2.25-3.25 inches, preferably in the range of 2.6-2.9 inches, and more preferably about 2.75 inches. The side walls 226, 228 can have a width D4 in the range of 1.75-2.75 inches, preferably in the range of 2.0-2.5 inches, and more preferably a width of about 2.29 inches. The center portion 231 of aperture 230 can have a width D5 in the range of 0.5-1.0 inches, preferably in the range of 0.6-0.8 inches, and more preferably a width of about 0.69 inches. The slot portions 232, 234 can have a width D6 in the range of 0.3-05 inches, preferably in the range of 0.25-0.45 inches and more preferably a width of about 0.69 inches. Alternatively, in some embodiments, other dimensions can be used, as would be understood by one of skill in the art, as informed by the present disclosure.

In addition, the side walls 226, 228 can extend outwardly from the back wall 210 by an angle ΘA in the range of 85-95 degrees, preferably in the range of 88-92 degrees, and more preferably an angle of about 90 degrees. Further, the securing portions 220, 222 can extend outwardly from a respective side wall 226, 228 by an angle ΘB in the range of 85-95 degrees, preferably in the range of 88-92 degrees, and more preferably an angle of about 90 degrees. Alternatively, in some embodiments, other dimensions can be used, as would be understood by one of skill in the art, as informed by the present disclosure.

The above-discussed dimensions and relative positions of portions of the securement device 200 are important in providing a device that provides the intended beneficial operation, as discussed herein.

In some embodiments, securing portions 220, 222 can include rounded corner portions to reduce the chance of injury due to abrasion when rushing to securement device 200.

Figure 5:
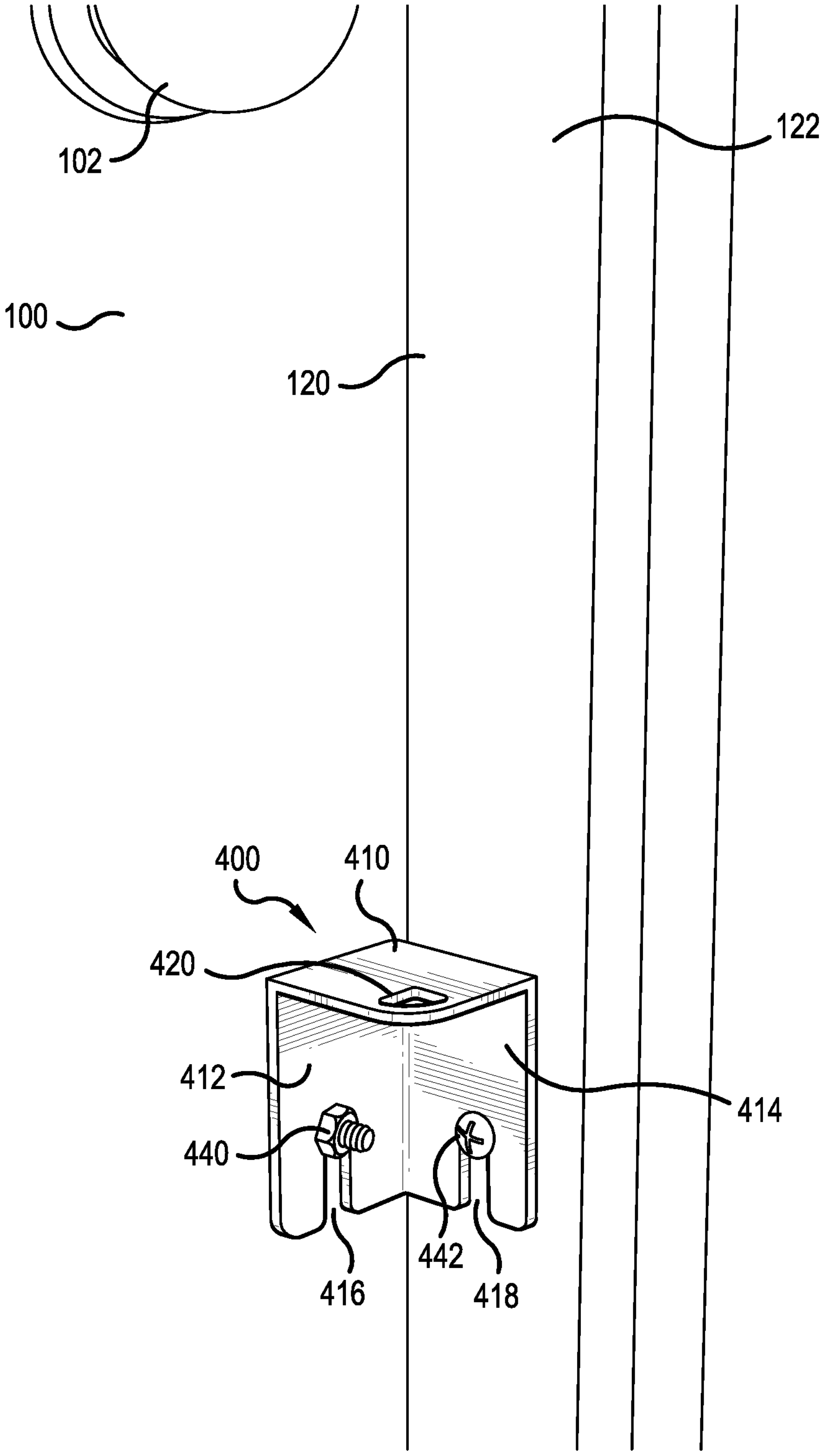
FIG. 5 is a door securement device, positioned on a door and door frame, in accordance with another embodiment of the present invention.

With reference to FIG. 5, there is shown a securement device 400 in accordance with another embodiment of the present invention. A securement device 400 can be positioned adjacent a door 100 and flat door frame 120.

Figure 6:
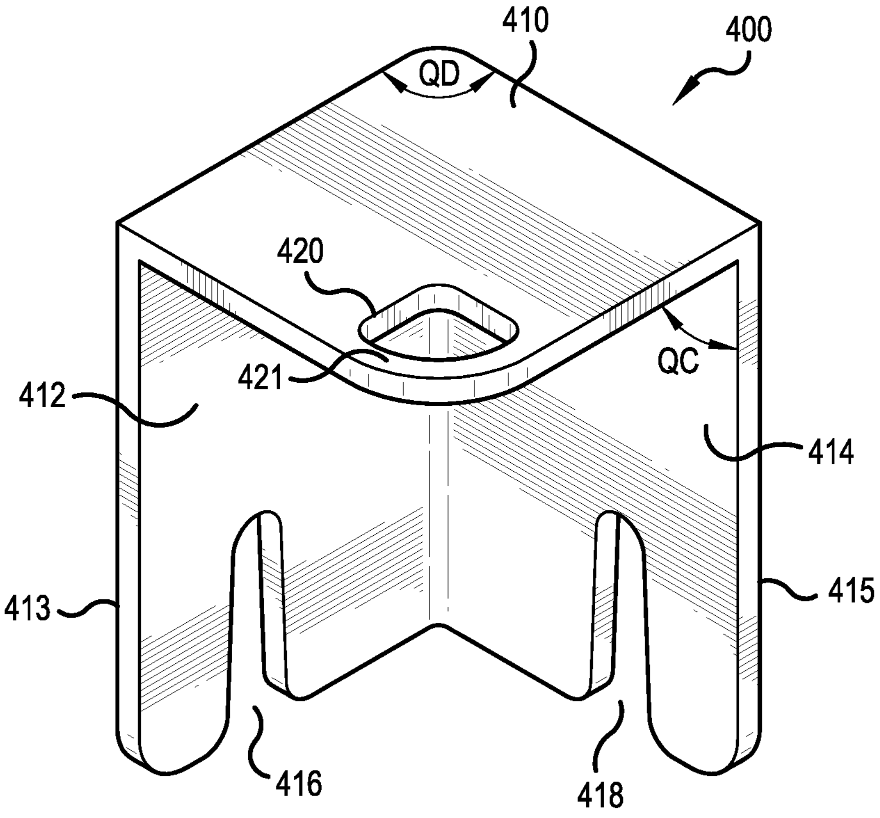
FIG. 6 is a perspective view of the door securement device of FIG. 5.
Figure 7:
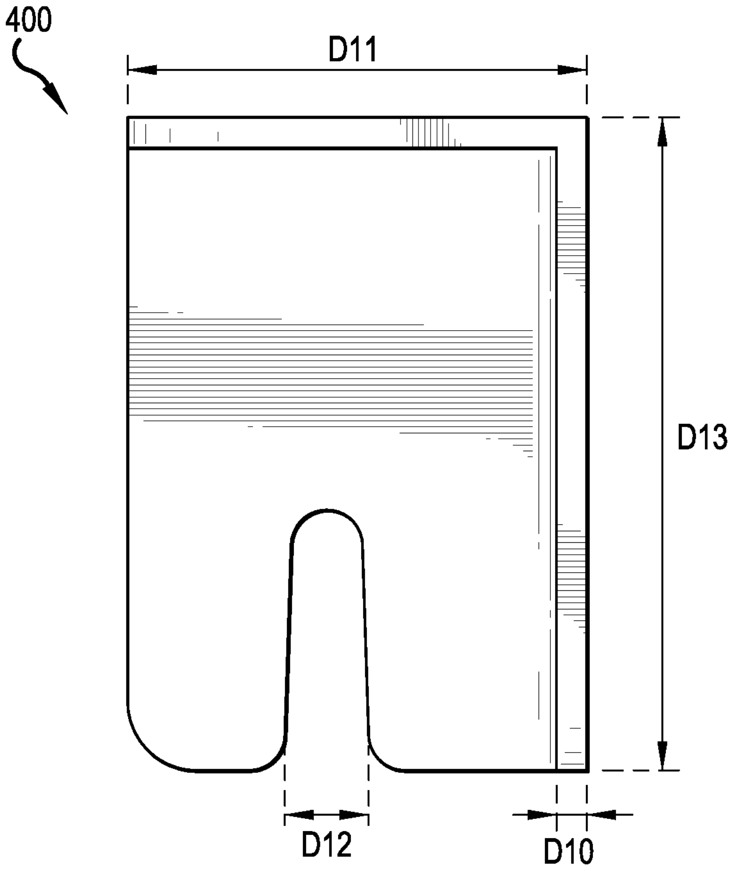
FIG. 7 is a side view of the door securement device of FIG. 5.
Figure 8:
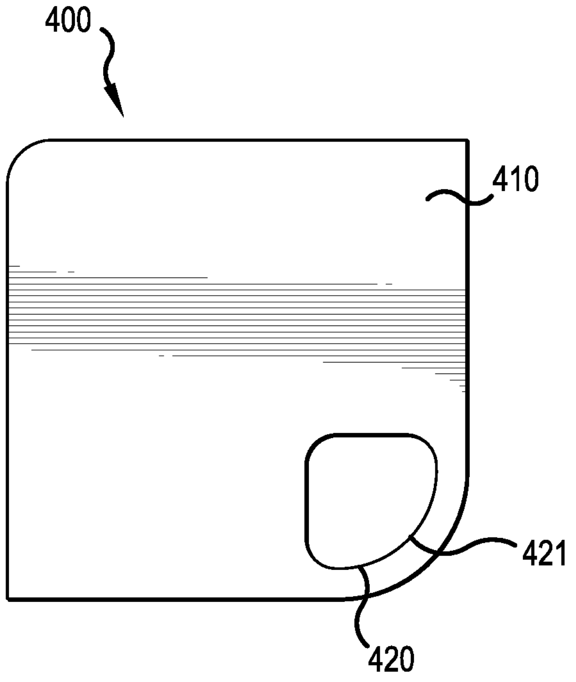
FIG. 8 is a top view of the door securement device of FIG. 5.

With continued reference to FIG. 5, and with reference to FIGS. 6-8, the securement device 200 includes a first side wall 412 and a second side wall 414 each extending substantially perpendicularly outwardly from a top wall 410. In addition, first side wall 412 and second side wall 414 are arranged substantially perpendicular to each other and are attached at adjacent sides, First side wall 412 includes a first side wall surface 413, and second side wall 414 includes a first side wall surface 415.

A first slot 416 and second slot 418 are defined in first side wall 412 and second side wall 414 respectfully. Top wall 410 can include a top aperture 420 defined therein. Top aperture 420 can include a curved edge 421.

A first fastener 416 is secured to door 100. A second fastener is secured to a door frame wall 120 of door frame 122.

As discussed above, the securement device 200 is designed to be used in conjunction with the stepped door frame 110 including a front edge 112, arranged substantially parallel to the door 100 when it is closed, that forms a lip or step about door frame 110, and a side edge 114, that is arranged substantially perpendicular to the door 100 when the door 100 is closed.

In contrast, in the present embodiment, the securement device 400 is designed to be used with a non-stepped door frame 122 that includes a flat door frame wall 120.

As discussed above with respect to securement device 200, securement device 400 can be easily put in place to secure a door 100, or be removed to by a user to allow a door to be opened.

In the securement device 400, the first slot 416 is defined to open at an edge of the first side wall 412, while the second slot 418 is defined to open at an edge of the second side wall 414. Also, in contrast to securement device 200 described above, securement device 400 is designed to be used with two fasteners 440, 442. The first fastener 440 is attached to the door 100, and the second fastener 442 is attached to the flat door frame wall 120 of door frame 122.

Of course, the determination of whether the first slot or the second slot 408 is positioned at a fastener at a door or a door frame depends on the relative positions or orientations of the door 100 and the door frame 122, and which side of the door 100 opens (i.e., the side proximate the door knob and opposite the side having hinges). Thus, due to its relatively symmetrical shape, the securement device 400 is designed and shaped to be used on both right side hinged and left side hinged doors.

In some embodiments, the securement device 400 can be made from steel having a thickness D10 in the range of 0.3-0.5 inches, preferably in the range of 0.25-0.45 inches, and more preferably a thickness of about 0.10 inches. The securement device 400 can be formed from 12 gauge steel. Alternatively 11 or 13 gauge steel could be used. Alternatively, in some embodiments, other materials can be used, as would be understood by one of skill in the art, as informed by the present disclosure. The securement device 400 can include the following dimensions.

The top wall 410 can have a width D11 in the range of 1.25-2.25 inches, preferably in the range of 1.5-2.0 inches and more preferably a width of about 1.75 inches. The first and second side walls 412, 414 can have widths aligned with and corresponding to those the width D11 of top wall 410. The first and second securement slots 416, 418 can have edge widths D12 in the range of 0.2-0.6 inches, preferably in the range of 0.3-0.4 inches, and more preferably widths of about 0.33 inches. The first and second securement slots 416, 418 can taper down to a narrower width such as, for example, 0.28 inches. The securing device 400 can have a height D13 in the range of 2.0-3.0 inches, preferably in the range of 2.25-2.75 inches, and more preferably a height of about 2.5 inches. Alternatively, in some embodiments, other dimensions can be used, as would be understood by one of skill in the art, as informed by the present disclosure.

In addition, the angle ΘC between first side wall 412 and top wall 410, and the angle between second side wall 414 and top wall 410 can be an angle in the range of 85-95 degrees, preferably in the range of 88-92 degrees, and more preferably an angle of about 90 degrees. Further, angle ΘD between first side wall 412 and second side wall 414 can be an angle in the range of 85-95 degrees, preferably in the range of 88-92 degrees, and more preferably an angle of about 90 degrees. Alternatively, in some embodiments, other dimensions can be used, as would be understood by one of skill in the art, as informed by the present disclosure.

The above-discussed dimensions and relative positions of portions of the securement device 400 are important in providing a device that provides the intended beneficial operation, as discussed herein.

The securement device 400 is designed and shaped such that one of first side wall 412 and second side wall 414 can be positioned adjacent to the door frame wall 120 of non-stepped door frame 122, while the other of first side wall 412 and second side wall 414 can be positioned adjacent to the surface of door 100. More specifically, securement device 400 is designed and shaped such that one of first side wall surface 413 and second side wall surface 415 can be positioned adjacent to the door frame wall 120 of non-stepped door frame 122, while the other of first side wall surface 413 and second side wall surface 415 can be positioned adjacent to the surface of door 100.

Thus, by way of the above discussed embodiments, a teacher or student can quickly and effectively secure a classroom door. Because only a single device needs to be put in position at the time of securing, the securing process is simple and straight forward, and a person can secure a classroom door even in a time of high stress, such as during a potential shooter event at a school. Use of the devices requires only the prior installation of a single fastener (first embodiment) or two fasteners (second embodiment). Further, the device is relatively inexpensive, which satisfies the constraints of school budgets, and satisfies the requirements of school and building safety codes by not creating obstacles that could hinder exiting out of a doorway of a classroom.

These and other changes can be made in light of the above-detailed description. In general, in the following claims, the terms used should not be construed to limit the invention to the specific embodiments disclosed in the specification and the claims, but should be construed to include all devices in accordance with the claims. Accordingly, the invention is not limited by the disclosure, but instead its scope is to be determined entirely by the following claims.

The invention claimed is:

1. A door securement device for securing a door to a door frame having a front door frame wall, the door having a first fastener attached thereto and the frame having a second fastener attached thereto, the door securement device comprising:

a top wall including a flat surface;

a first side wall directly connected to and extending substantially perpendicularly outwardly from the top wall;

a second side wall directly connected to and extending substantially perpendicularly outwardly from the top wall, and substantially perpendicularly from the first side wall;

a first slot defined in the first side wall; and a second slot defined in the second side wall, wherein the first slot and the second slot are sized and shaped to retain respective heads of the first and second fasteners, and wherein the first side wall is sized and shaped to be positioned adjacent to one of a surface of the door and the front door frame wall, and the second side wall is sized and shaped to be positioned adjacent to the other of the a surface of the door and surface of the front door frame wall, and wherein the top wall, the first side wall and the second side wall are stamped from stamping and bending a portion of steel.

2. The door securement device of claim 1, wherein the first side wall includes a first side wall surface, the second side wall includes a second side wall surface, and the first side wall surface is sized and shaped to be positioned adjacent to one of a surface of the door and the front door frame wall, and the second side wall surface is sized and shaped to be positioned adjacent to the other of the a surface of the door and surface of the front door frame wall.

3. The door securement device of claim 1, wherein the door frame is a non- stepped door frame.

4. The door securement device of claim 1, wherein the first slot and the second slot are tapered such that heads of the first fastener and second fastener, respectively, can be retained by narrow portions of the slots, and not retained by wider portions of the slots.

5. The door securement device of claim 1, wherein the top wall has a width in the range of 1.5 to 2.0 inches, the first side wall has a height in the range of 2.25-2.75 inches; and the first side wall has a height in the range of 2.25-2.75 inches.

6. A method of making a door securement device for securing a door to a door frame having a front door frame wall, the door having a first fastener attached thereto and the frame having a second fastener attached thereto, the securement device including a top wall, a first side wall extending substantially perpendicularly outwardly from the top wall, a second side wall extending substantially perpendicularly outwardly from the top wall, and substantially perpendicularly from the first side wall, a first slot defined in the first side wall;

and a second slot defined in the second side wall, wherein the first slot and the second slot portions are sized and shaped to retain respective heads of the first and second fasteners, and wherein the first side wall is sized and shaped to be positioned adjacent to one of a surface of the door and the front door frame wall, and the second side wall is sized and shaped to be positioned adjacent to the other of the a surface of the door and surface of the front door frame wall, the method comprising:

stamping a predetermined shaped portion of steel;

bending the portion of steel to form the top wall;

the first side wall; and the second side wall.

* * * * *